(12) United States Patent
Wojewoda et al.

(10) Patent No.: US 6,551,685 B1
(45) Date of Patent: Apr. 22, 2003

(54) IN-MOLD LABEL

(75) Inventors: Robert J. Wojewoda, Amelia, OH (US); Thomas G. Scully, New Albany, IN (US); Philip J. Albenice, New Albany, IN (US)

(73) Assignee: Multi-Color Corporation, Cincinnati, OH (US)

( * ) Notice: Subject to any disclaimer, the term of this patent is extended or adjusted under 35 U.S.C. 154(b) by 0 days.

(21) Appl. No.: 09/575,294

(22) Filed: May 19, 2000

(51) Int. Cl.⁷ .................................................. B32B 3/24
(52) U.S. Cl. ...................... 428/132; 428/131; 428/343; 428/195; 428/220; 264/509; 156/87
(58) Field of Search ................................ 428/131, 132, 428/343, 195, 220; 264/509; 156/87

(56) References Cited

U.S. PATENT DOCUMENTS

| | | | | |
|---|---|---|---|---|
| 3,072,969 A | * | 1/1963 | Du Bois | 264/102 |
| 3,108,850 A | * | 10/1963 | Brandt | 264/275 |
| 3,417,175 A | * | 12/1968 | Brown et al. | 264/220 |
| 3,474,498 A | * | 10/1969 | Hoppes | 249/103 |
| 3,550,197 A | * | 12/1970 | Szajna et al. | 215/382 |
| 3,768,942 A | * | 10/1973 | Langecker | 425/126 |
| 4,904,324 A | * | 2/1990 | Heider | 156/214 |
| 4,986,866 A | * | 1/1991 | Ohba et al. | 156/220 |
| 5,254,302 A | * | 10/1993 | Yamanaka | 156/209 |
| 5,472,545 A | * | 12/1995 | Malki | 156/252 |
| 5,804,127 A | | 9/1998 | Takatori et al. | |
| 5,916,646 A | * | 6/1999 | Baudin | 428/36.1 |

* cited by examiner

*Primary Examiner*—William P. Watkins, III
(74) *Attorney, Agent, or Firm*—James C. Eaves, Jr.; Karen L. Lynd; Greenebaum Doll & McDonald PLLC

(57) ABSTRACT

The present invention relates to an in-mold label having a roughened inside surface to engage an article being molded in the mold. This roughened inside surface reduces air-entrapped blistering formed during molding, the air-entrapped blisters being between the label and the molded article. Preferably the label includes a plurality of perforations therein. To create the roughened inside surface at the time of perforating the label, the perforations are made by needles passing from the outside or exterior surface of the label through the inside surface thereby creating burrs on the inside surface; the inside surface being the surface which will engage the article to be molded. The label also preferably, in addition to the plurality of perforations and roughened inside surface, includes adhesive in a pattern on the inside surface.

16 Claims, 4 Drawing Sheets

IN-MOLD LABEL

BACKGROUND OF THE INVENTION (a) Field of the Invention

The present invention relates to an in-mold label having a roughened inside surface to engage an article being molded in the mold. This roughened inside surface reduces air-entrapped blistering formed during molding, the air-entrapped blisters being between the label and the molded article. Preferably the label includes a plurality of perforations therein. To create the roughened inside surface at the time of perforating the label, the perforations are made by needles passing from the outside or exterior surface of the label through the inside surface thereby creating a plurality of burrs on the inside surface; the inside surface being the surface which will engage the article to be molded. The label also preferably, in addition to the plurality of perforations and roughened inside surface, includes adhesive in a pattern on the inside surface.

(b) Description of the Prior Art

In Takatori et al. U.S. Pat. No. 5,804,127, the reference teaches a laminating blow molding method. A resin sheet has 1 to 500 fine holes per 100 cm² punched therein to form projections thereon as burrs. These burrs side of the resin sheet is placed in a blow mold so that the burrs face the cavity face. After the parison is blown, the mold is heated to a temperature exceeding the softening temperature of the resin sheet so squash the fine holes so that they substantially do not remain in the resin sheet. See, for example, FIGS. 5A and 5B. In Takatori, it is the non-burr side of the resin sheet is the side which will engage the hollow article being made. In contrast to the teachings of Takatori, the molds used with the labels of the present invention are cooled and not heated.

SUMMARY OF THE INVENTION

The present invention relates to an in-mold label having a roughened inside surface to engage an article being molded in the mold. This roughened inside surface reduces air-entrapped blistering formed during molding, the air-entrapped blisters being between the label and the molded article. Preferably the label includes a plurality of perforations therein. To create the roughened inside surface at the time of perforating the label, the perforations are made by needles passing from the outside or exterior surface of the label through the inside surface, or the surface which will engage the article to be molded. The label also preferably, in addition to the plurality of perforations and roughened inside surface, includes adhesive in a pattern on the inside surface, although the adhesive can be applied in a flood pattern. Generally, the label may be of paper or plastic material and have label information printed thereon. Also, an anti-static material is also preferably overprinted, if the substrate is not manufactured with anti-static qualities.

Typically, in a gravure printing process, a roll of label material has the label information, anti-static material, and adhesive printed thereon and re-rolled. Then, the roll is preferably perforated, sheeted, jogged, guillotine cut into blocks, and finally die cut into individual labels. While this is the method used by the inventors, other process can be used to produce the in-mold labels of the current invention. For example, a flexographic press could also be used. Here, as an example, the substrate could be perforated, the information printed thereon and a varnish coat applied. This would produce labels with the desired roughened surface to engage the article being molded, but, with the printing and coating after perforating, the perforation holes would not remain open. Perforation can occur anywhere in the label manufacturing process, for example, during initial production of the substrate, prior to the label printing process, after the label printing process before individual labels are produced, or after the individual labels have been cut. For example, the perforation process can be accomplished in roll to roll, or roll to sheet, or roll to rotary die cut labels in the flexographic process.

More particularly, the present invention comprises an in-mold label having a substrate, having a first surface for engaging a mold surface and an opposed second surface for engaging an article being molded, the second surface being roughened. Even further, the present invention comprises an in-mold label having a substrate having a first surface for engaging a mold surface and an opposed second surface for engaging an article being molded; the substrate having a plurality of perforations therethrough, the plurality of perforations extending from the first surface through the second surface creating a plurality of burrs on the second surface.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 6:
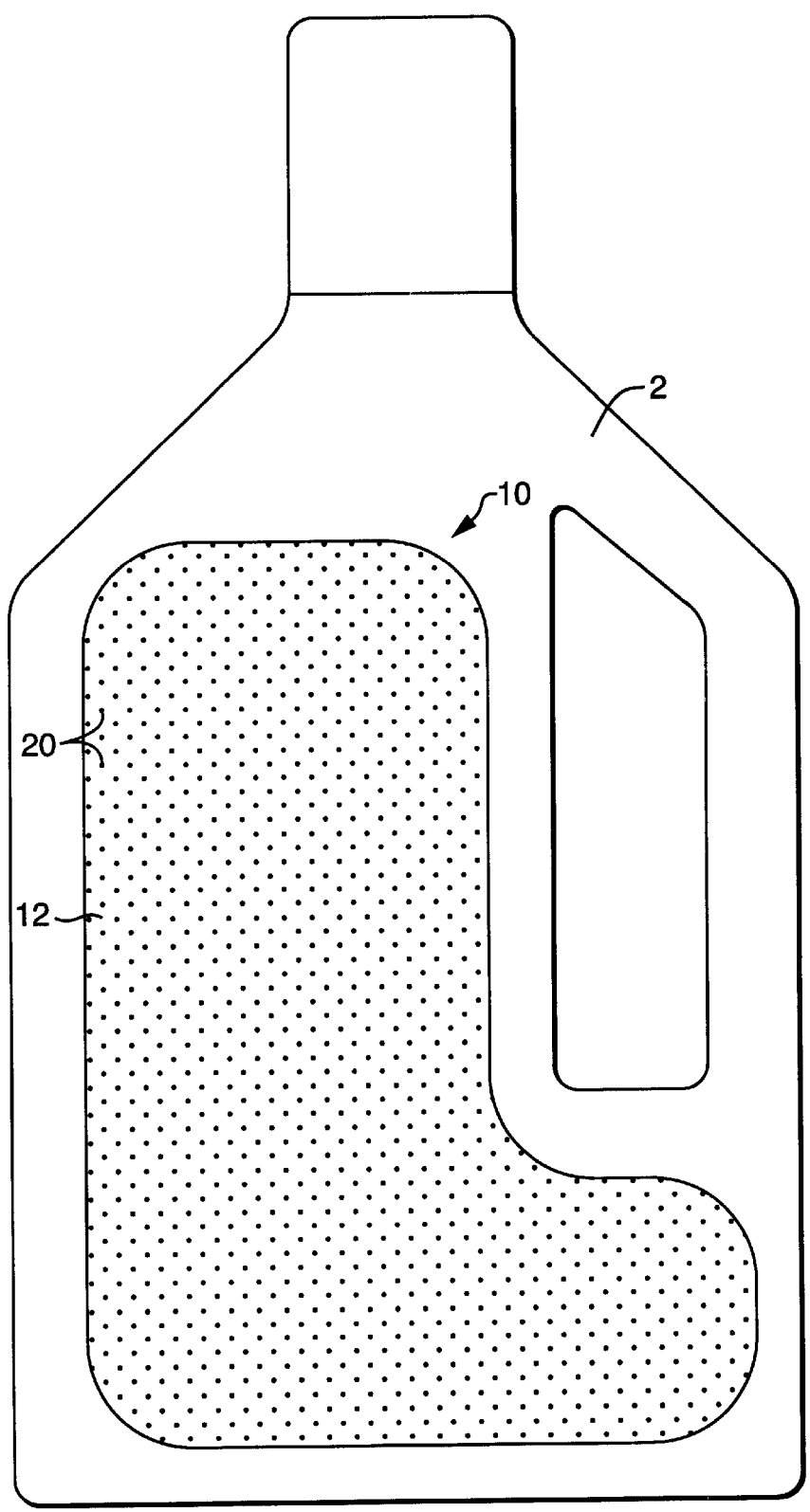

With reference to FIGS. 1–6, the in-mold label 10 of the instant invention is shown having an exterior surface 12 and an interior surface 14. A plurality of perforations 20 are made in the label 10 from the surface 12 toward the surface 14, thereby creating a plurality of rough openings or burrs 22 on surface 14. In the preferred embodiment shown, the surface 14 includes a patterned adhesive 30. As seen in FIG. 6, a label 10 has been attached to a molded article 2.

This was accomplished by placing the label 10 into a mold such that the surface 12 is adjacent the mold so that the surface 14 with burrs 22 and adhesive 30 receives the parison blown into the mold. The test results, explained later, demonstrate that this combination of burrs 22 and patterned adhesive 30 on surface 14 significantly reduce air-entrapped blistering during the molding process, blistering being the retention of air between the label 10 and the article 2.

The in-mold industry currently uses paper and plastic substrates for labels 10. Either paper or plastic substrates can be used with the present invention. With paper substrates, information printed on the label would be on exterior surface 12 using convention printing techniques. With plastic substrates, information could be printed on exterior surface 12 or, with a transparent substrate, reverse printed on interior surface 14, both using conventional printing techniques. This information will typically contain product information about the product to be placed in the molded article 2, for example, information identifying the product and how to use the product.

Plastic substrates can be produced with an anti-static quality or an anti-static material can be included in an overprint varnish, such as, for example, Flint TUW29916, so that the individual labels 10 can be easily separated so that it is easy to place individual labels into the mold. An overprint varnish with or without anti-static material is generally applied as part of the printing process to coat any printed information on surface 12.

The preferred substrate for the present invention is plastic, because a plastic label will shrink slightly during the blow molding process when the hot parison contacts it thereby reducing the diameter of, or even closing, perforations 20. It is believed that label 10 should have a preferred thickness of 0.0032 inch (0.081 mm) to 0.004 inch (0.102 mm).

A paper label 10 could have a flood adhesive, total coverage of the surface 14, or a patterned adhesive for attachment to article 2. A plastic label 10 could also have a flood adhesive, or a patterned adhesive for attachment to article 2. Typically, a patterned adhesive is applied with a gravure cylinder on a gravure press. When a plurality of labels are being produced as part of a moving web, prior to sheeting and cutting into individual labels 10, the adhesive gravure cylinder is the last station on the gravure press. The adhesive cylinder has etched cells that are filled with adhesive which is applied to the moving web in the desired pattern. The preferable pattern is a "dot" pattern with each "dot" approximately 10 to 20 microns in height and which are approximately 60 to 100 microns wide. The adhesive pattern can also be applied via the flexographic process. For example, adhesive materials manufactured by Morton can be used. These adhesive materials function to create a mechanical bond between the label and the article. In contrast, for a fusion bond, the present invention can be employed with extruded coated adhesive substrates, such as, for example, Kimdura ITE105 by Kimberly-Clark.

When the label 10 is attached to the article 2 during the molding process, it is the combination of heat, pressure, and time which cause the adhesive bonding. The adhesive activates when the hot plastic is blown into the article and is pushed against the applied label in the mold.

Through the gravure printing process, the label web is unrolled and passed through the gravure press to have thee information printed thereon, the anti-static material printed thereon, and the adhesive printed thereon. The printed web is then re-rolled. The perforation process is accomplished as the initial part of the process of cutting the roll having the plurality of labels printed thereon into individual labels. Typically, producing the individual labels is a multi-step process consisting of unrolling the printed web and passing it through a perforator; cutting the roll into sheets, each sheet having a plurality of labels thereon; jogging a desired number of sheets so that they are properly aligned and compressed on each other for cutting; guillotine cutting the sheets to form generally four-sided blocks of labels, for example, each block having one or two labels therein; and, die cutting the blocks to produce the individual labels of desired shape.

As the printed web roll is unwound, it is passed through a cold needle perforator. In contrast, a hot-needle perforator should preferably not be utilized for this perforation process. The use of a hot needle would not produce the desired burrs 22 or roughness on surface 14. Further, a hot needle would prematurely activate the adhesive 30, would thermally deform the perforation holes 20, and could cause problems in die-cutting the sheeted perforated materials.

Preferably, the needle shape should be slender and pointed to create a rougher surface on the label surface 14. A dull or wider needle will not produce the desired rough surface, for example, having the feel of a grit blasted surface to the touch. Typically, the preferred needle will have a sharp point and an expanding taper from the tip to a distance of about 3 mm, at which location the needle will have a diameter of 1.22 mm, although needles with similar dimensions can be employed. Depending on the needle employed, it is envisioned that, with a substrate having a thickness of about 0.081 mm to 0.102 mm, the needle will extend from surface 12 through surface 14 so that the preferred diameter range of a perforation is from about 0.007625" (0.2 mm) to 0.023625" (0.6 mm), with a preferred diameter of 0.015625" (0.4 mm).

Figure 1:
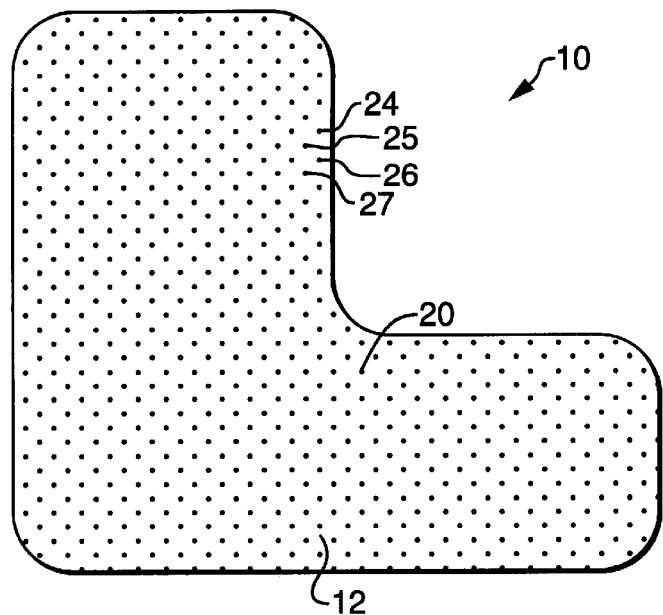
FIG. 1 shows a front view of the outside or exterior surface of an in-mold label of the present invention.
Figure 2:
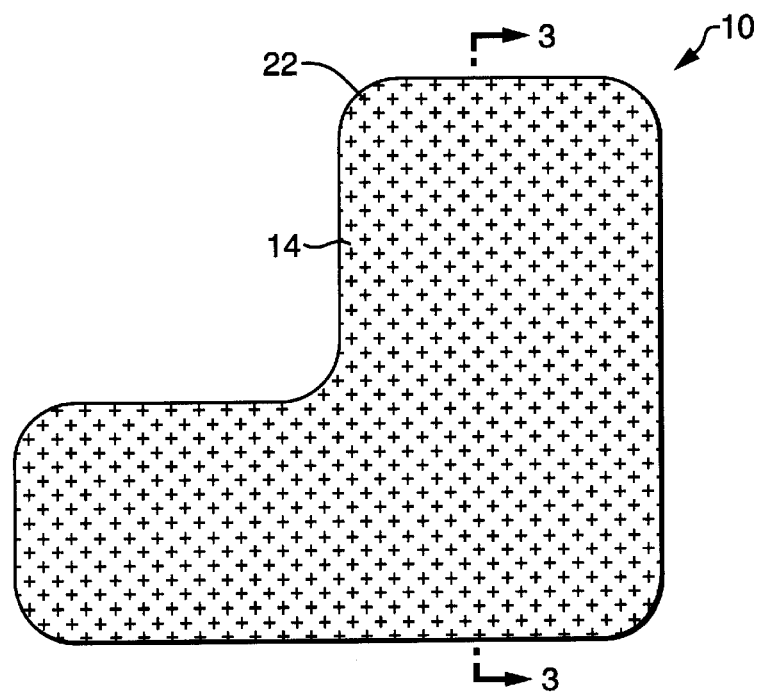
FIG. 2 shows a rear view of inside surface of the in-mold label of FIG. 1.
Figure 3:
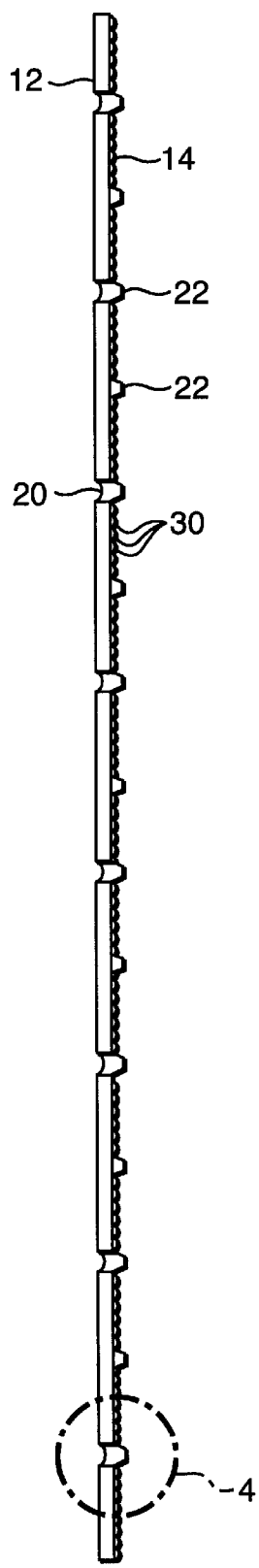
FIG. 3 shows a cross-section view of a portion of the in-mold label of FIGS. 1 and 2 along the lines 3—3 of FIG. 2.
Figure 4:
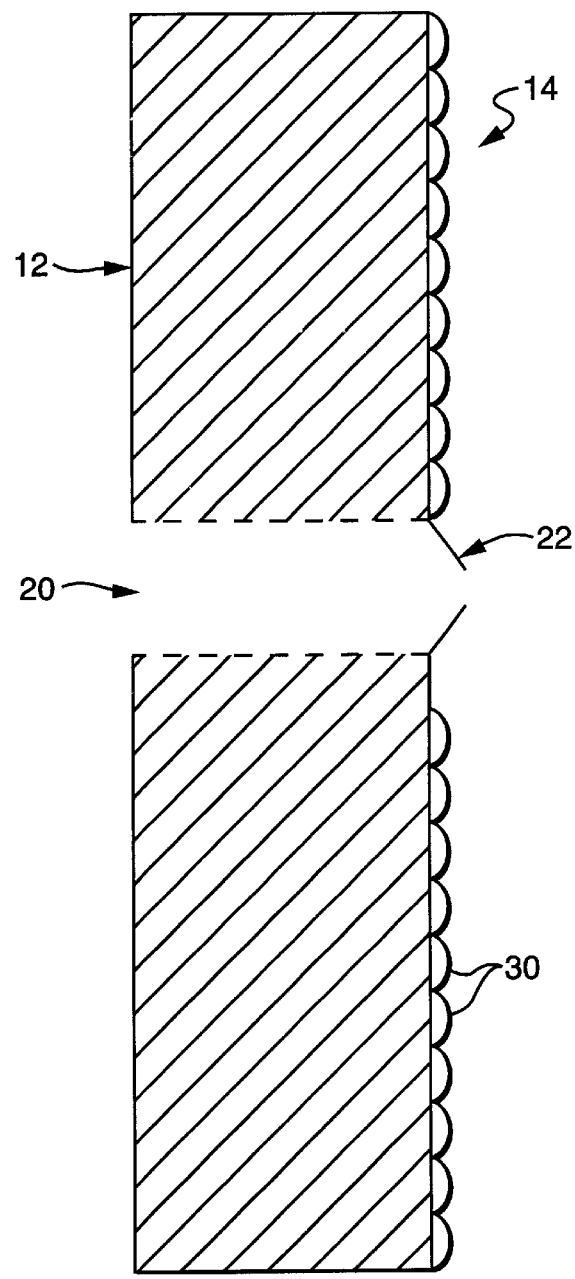
FIG. 4 shows an enlarged two-dimensional view of a portion of FIG. 3, identified by the circled portion on FIG. 3.
Figure 5:
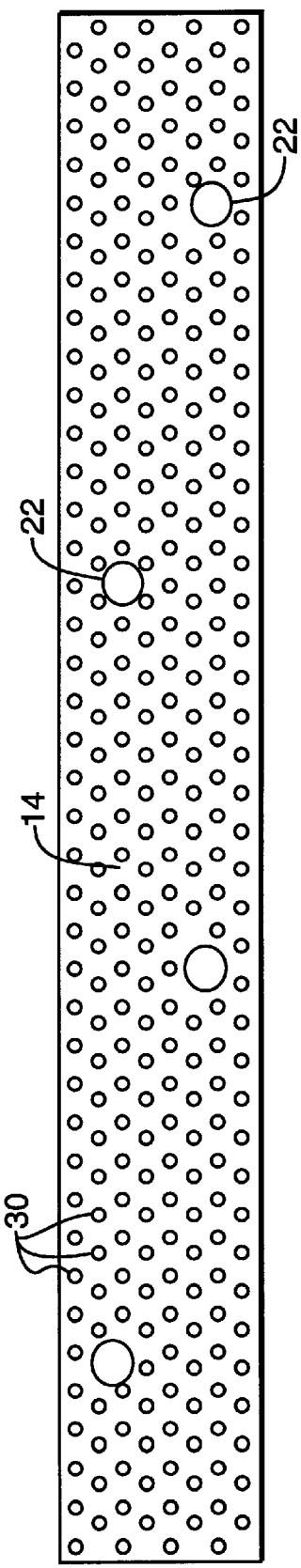
FIG. 5 shows an enlarged view of a portion of the inside surface of the in-mold label of FIG. 2; and, FIG. 6 shows a front view of a blow-molded article having an in-mold label of the present invention attached thereto.

A plurality of like needles are contained on a perforation roller in rows. The needles in adjacent rows will be preferably off-set, or "nested". In FIG. 1, four adjacent rows of perforations are identified by the numbers 24, 25, 26, and 27. Assume that in any of these rows, the distance from the center of one perforation to the next is about 4 mm, although this distance can vary. With this spacing, the distance between the rows of perforations is about 2 mm. The perforations in rows 24 and 26 are aligned and the perforations in rows 25 and 27 are aligned, the perforations in rows 24 and 26 being off-set from those in rows 24 and 26. An imaginary line drawn perpendicular to these rows and connecting two perforations in rows 24 and 26 will bisect an imaginary line connecting the two perforations on opposite sides of this perpendicular line in either row 25 or 27. The same applies to an imaginary perpendicular line connecting two perforations in rows 25 and 27. This spacing creates about 91 perforations per square inch (per 6.5 square cm). Testing has shown this spacing to be preferable for in-mold application of the label to an article.

As has been explained, preferred label 10 has a plurality of perforations 20 therein so that surface 14 with burrs 22 provides a grit blast feel to the fingers. Preferred label 10 also includes a patterned adhesive pattern on surface 14. During blow molding, air venting is a major player in blowing quality HDPE containers. Without proper air venting from the mold, quality issues such as surface porosity, inner handle radii pinholes, and in-mold label blistering can be affected. Also, to prevent laminar air flow, proper grit blasting to roughen the inner mold surfaces is required, resulting in smoother molded article surfaces. However, even with proper mold maintenance, blow mold articles receiving labels without through perforations 20 or adhesive pattern 30 have higher defect rates than those having these features, particularly with regard to air-entrapped blistering. Testing has demonstrated the following performance:

Test 1:
1. Labels with patterned adhesive, no perforations—36.9% of articles had blisters between the label and respective article.
2. Labels with patterned adhesive, with perforations to create a roughened inner label surface, but with perforations sealed so that no air could escape therethrough—18.8% of the articles had blisters between the label and respective article, demonstrating that the burrs 22 causing surface 14 to be roughened reduced blistering.
3. Labels with patterned adhesive, with perforations to create a roughened inner label surface 14, the perforations being open so that air could at least initially escape therethrough—1.2% of the articles had blisters between the label and respective article.

Test 2:
1. Labels with flood adhesive, no perforations—33.8% of the articles had blisters between the label and respective article.
2. Labels with flood adhesive, with perforations to create a roughened inner label surface 14, the perforations being open so that air could at least initially escape therethrough—7.9% of the articles had blisters between the label and respective article.

From the above test results, labels 10 including the combination of a patterned adhesive 30 on surface 14 with perforations 20 causing burrs 22 on surface 14 so that the perforations 20 will permit air to escape therethrough in the article molding process will yield superior results as compared to labels without one or more of these features. The inventors believe that the roughness on surface 14 deters a laminar flow of air between the label 10 and the article 2 being molded and assures the air flow between them is turbulent. As the bottle or article 2 is being formed, air flow is being compressed creating a boundary layer flow between the mold surface and the forming bottle, which is exhausted out of the mold via venting channels. If the mold surface is smooth, it will result in a laminar boundary flow. A laminar flow will not fully exhaust out of the mold due to the conforming nature of a laminar flow. For proper air venting, the full mold surface must be roughened to cause a turbulent air flow rather than a laminar flow. In the mold, label surface 12 is adjacent the mold surface and roughened surface 14 is to engage the parison being blown to form the article. This roughened surface 14 functions as the roughened mold surface to create the desired turbulent air flow in the area between the label and the article. The inclusion of perforations thought the label 10 also provides openings for the escape of air to reduce air-entrapped blistering further.

Testing has also demonstrated that the use of the label of the present invention permits articles to be molded at increased output. For example, when using Arjobex Polyart plastic substrate labels without perforations with a R&B indexing four cavity wheel, 20 articles or bottles a minute could be produced with acceptable blistering characteristics. When the plastic substrate labels were perforated to create the roughened article engaging surface, the R&B wheel increased production to 28 articles per minute, or a 40% increase in output, with no blistering. As another example of increased production with perforated labels, using the same Arjobex Polyart plastic substrate labels without perforations, a Graham 14 station wheel could produce 38 articles per minute with acceptable blistering characteristics. With perforated labels, the Graham wheel increased production to 55 articles per minute, or a 44% increase in output, with no blistering.

The foregoing detailed description is given primarily for clearness of understanding and no unnecessary limitations are to be understood therefrom for modifications can be made by those skilled in the art upon reading this disclosure and may be made without departing form the spirit of the invention and scope of the appended claims.

What is claimed is:

1. An in-mold label, comprising: a substrate, said substrate having a first surface for engaging a mold surface and opposed second surface for engaging an article being molded, an adhesive applied to said second surface, and a plurality of perforations through said substrate, said plurality of perforations extending from said first surface through said second surface causing said second surface to be roughened.

2. The in-mold label of claim 1, where said adhesive is a patterned adhesive.

3. The in-mold label of claim 1, where said plurality of perforations are located on said label in a plurality of rows.

4. The in-mold label of claim 3, where said plurality of rows of perforations are in a nested configuration.

5. The in-mold label of claim 1, where each of said plurality of perforations has a diameter of between about 0.2 mm and about 0.6 mm.

6. The in-mold label of claim 1, where each of said plurality of perforations has a diameter of about 0.4 mm.

7. The in-mold label of claim 4, where there is a distance between each of said plurality of perforations in each of said rows, said distance being about 4 mm, and where each of said plurality of perforations has a diameter of between about 0.2 mm and about 0.6 mm.

8. An in-mold label, comprising: a substrate, said substrate having a first surface for engaging a mold surface and an opposed second surface for engaging an article being molded; said substrate having a plurality of perforations therethrough, said plurality of perforations extending from said first surface through said second surface creating a plurality of burrs on said second surface; and an adhesive applies to said second surface.

9. The in-mold label of claim 8, where said adhesive is a patterned adhesive.

10. The in-mold label of claim 8, where said plurality of perforations are located on said label in a plurality of rows.

11. The in-mold label of claim 10, where said plurality of rows of perforations are in a nested configuration.

12. The in-mold label of claim 8, where each of said plurality of perforations has a diameter of between about 0.2 mm and about 0.6 mm.

13. The in-mold label of claim 12, where each of said plurality of perforations has a diameter of about 0.4 mm.

14. The in-mold label of claim 9, where each of said plurality of perforations has a diameter of between about 0.2 mm and about 0.6 mm and where said patterned adhesive is applied as a plurality of dots, each of said dots having a dot diameter of between about 60 microns and about 100 microns.

15. The in-mold label of claim 1, where said adhesive is a flood adhesive.

16. The in-mold label of claim 8, where said adhesive is a flood adhesive.

* * * * *

UNITED STATES PATENT AND TRADEMARK OFFICE
CERTIFICATE OF CORRECTION

PATENT NO.     : 6,551,685 B1  
DATED          : April 22, 2003  
INVENTOR(S)    : Wojewoda et al.

Page 1 of 1

It is certified that error appears in the above-identified patent and that said Letters Patent is hereby corrected as shown below:

<u>Column 3,</u>
Line 14, insert -- label -- after "printed"

<u>Column 6,</u>
Line 5, insert -- an -- after "a mold surface and"
Line 35, delete "applies" and insert instead -- applied --

Signed and Sealed this

Seventeenth Day of February, 2004

JON W. DUDAS  
*Acting Director of the United States Patent and Trademark Office*